United States Patent
Köstermeier (10) Patent No.: US 10,569,321 B2
(45) Date of Patent: Feb. 25, 2020

(54) DEVICE AND METHOD FOR FLOW-FORMING WORKPIECES

(71) Applicant: Repkon Machine and Tool Industry and Trade Inc., Kalamis-Istanbul (TR)

(72) Inventor: Karl-Heinz Köstermeier, Rheda-Wiedenbrück (DE)

(73) Assignee: Repkon Machine and Tool Industry and Trade Inc., Istanbul (TR)

( * ) Notice: Subject to any disclaimer, the term of this patent is extended or adjusted under 35 U.S.C. 154(b) by 354 days.

(21) Appl. No.: 15/501,830

(22) PCT Filed: Nov. 4, 2015

(86) PCT No.: PCT/EP2015/075673
§ 371 (c)(1),
(2) Date: Feb. 4, 2017

(87) PCT Pub. No.: WO2016/083086
PCT Pub. Date: Jun. 2, 2016

(65) Prior Publication Data
US 2018/0178266 A1   Jun. 28, 2018

(30) Foreign Application Priority Data
Nov. 28, 2014   (EP) .................................. 14004035

(51) Int. Cl.
*B21B 19/14*   (2006.01)
*B21D 22/16*   (2006.01)
(Continued)

(52) U.S. Cl.
CPC ............. *B21D 22/16* (2013.01); *B21D 17/02* (2013.01); *B21D 17/04* (2013.01); *B23B 23/00* (2013.01)

(58) Field of Classification Search
CPC ........ B21D 22/16; B21D 17/02; B21D 17/04; B21D 17/06; B21D 17/08; B23B 23/00; B23B 37/16
(Continued)

(56) References Cited

U.S. PATENT DOCUMENTS 4,766,752 A * 8/1988 Gronert .................. B21B 19/14
                                                            72/110
6,758,077 B2 * 7/2004 Kaneko .................. B21D 22/16
                                                           72/370.01
(Continued)

FOREIGN PATENT DOCUMENTS

EP    2127775 A1   12/2009
EP    2210682 A1    7/2010
(Continued)

OTHER PUBLICATIONS

WIPO, International Search Report (on parent PCT application), dated Feb. 3, 2016.
(Continued)

*Primary Examiner* — David B Jones
(74) *Attorney, Agent, or Firm* — Laurence P. Colton; Smith Tempel Blaha LLC (57) ABSTRACT

A device for flow-forming workpieces having a rotatable first, outer forming tool for acting upon an outer contour of a first workpiece in the form of a hollow body. The device also has a first, inner forming tool for acting upon an inner contour of the workpiece. The first workpiece can be set in rotation about a first workpiece axis and can be plastically deformed by a pressure applied by the first, inner forming tool and the first, outer forming tool in a forming zone formed between the first forming tools by the material being made to flow between the first forming tools. The device has a drive for driving the first, outer forming tool.

12 Claims, 9 Drawing Sheets

(51) Int. Cl.
  *B21D 17/04* (2006.01)
  *B21D 17/02* (2006.01)
  *B23B 23/00* (2006.01)

(58) Field of Classification Search
  USPC .............................................. 72/110; 29/508
  See application file for complete search history.

(56) References Cited

U.S. PATENT DOCUMENTS

| | | | | |
|---|---|---|---|---|
| 7,316,142 | B2* | 1/2008 | Lancaster | B21D 22/16 |
| | | | | 72/110 |
| 8,161,620 | B2* | 4/2012 | Ficker | B21H 1/06 |
| | | | | 29/505 |
| 8,322,182 | B2* | 12/2012 | Haas | B21D 22/16 |
| | | | | 72/348 |
| 8,997,541 | B2* | 4/2015 | Nillies | B21C 37/26 |
| | | | | 72/85 |
| 10,124,388 | B2* | 11/2018 | Kostermeier | B21D 22/16 |
| 2008/0314113 | A1 | 12/2008 | Minoguchi | |

FOREIGN PATENT DOCUMENTS

| | | |
|---|---|---|
| EP | 2210683 A1 | 7/2010 |
| EP | 2343138 A1 | 7/2011 |
| JP | S57112911 A | 7/1981 |

OTHER PUBLICATIONS

WIPO, International Preliminary Report on Patentability (on priority application PCT/EP2015/075673), dated May 30, 2017.

* cited by examiner

DEVICE AND METHOD FOR FLOW-FORMING WORKPIECES

STATEMENT OF RELATED APPLICATIONS

This application claims the benefit of and is the US National Phase of International Application No. PCT/EP2015/075673 having an International Filing Date of 4 Nov. 2015, which claims the benefit of European Patent Application No. 14004035.3 having a filing date of 28 Nov. 2014.

BACKGROUND OF THE INVENTION

Technical Field

The invention relates to a device for flow-forming hollow-body-shaped workpieces having a rotatable first outer forming tool for acting on an outer contour of a first hollow-body-shaped workpiece and a first inner forming tool for acting on an inner contour of the workpiece, wherein the first workpiece can be displaced in rotation about a first workpiece axis and can be plastically deformed by a pressure applied by the first inner forming tool and the first outer forming tool in a forming zone formed between the first forming tools because the material is being caused to flow between the first forming tools.

This invention also relates to a method for flow-forming workpieces, in particular with the above summarized device, wherein at least one first rotating outer forming tool, in particular a forming roller, acts on an outer contour of a hollow-body-shaped first workpiece, wherein the first outer forming tool interacts with a first inner forming tool arranged inside the workpiece such that a forming zone is developed between the first inner forming tool and the first outer forming tool, in which zone the material of the first workpiece is caused to flow by a pressure exerted by the first forming tools.

Prior Art

Devices and methods for flow-forming are known for example from EP 2127775. In the methods being discussed, hollow-body-shaped, preferably rotation-symmetrical workpieces are produced by the plastic deformation of preforms or semi-finished products. Flow-forming is in particular a cold-forming method, i.e. a method which is carried out below the recrystallization temperature of the in particular metallic workpiece material to be formed. Particularly preferably, the workpieces are supplied to the device at room temperature such that the temperature increases while the flow-forming method is being carried out, proceeding from the supply temperature of the workpieces, merely as a result of the heat which is produced by the internal friction of the plastically formed material during forming.

The forming effect in methods and devices of the type being discussed is produced by an inner and an outer forming tool, which act on the inner contour and the outer contour of the hollow-body-shaped workpiece. In so doing, the outer forming tool exerts a pressure on the outer contour of the workpiece which in turn is supported on the inner forming tool with its inner contour. As a result of the pressure built up between the forming tools, a forming zone in which the material of the workpiece is plasticized and begins to flow develops between the tools. In so doing, the workpiece rotates about a workpiece axis and is moved relative to the outer and/or inner forming tools along the workpiece axis in a feed motion. As a result of the superposition of the rotation and feed motion, the forming zone with the flowing workpiece moves through the workpiece in an almost spiral motion. In so doing, the material in the forming zone flows in an axial direction, in a radial direction and/or in a circumferential direction of the workpiece about the workpiece axis, relative to the workpiece axis.

With the methods and devices of the type being discussed, not only the inner diameter, the outer diameter and/or the wall thickness of the workpiece can be influenced or changed, but it is also possible to form special contours. In this way, for example, reinforcing ribs and/or other profiles can be formed, in particular on the inner contour of the workpiece.

In known methods and devices of the type being discussed, the workpiece is axially tensioned, for example as described in EP 2127775, wherein a corresponding workpiece magazine and a workpiece buttress act on both ends of the workpiece. Alternatively, and/or additionally, however, the use of a clamping chuck can be conceived. According to the prior art, the workpiece is not only fixed by the aforementioned tensioning means, but also displaced in rotation, i.e. the rotary drive of the device is generally housed in a spindle box and acts directly on the workpiece via the tensioning means used in each case.

In so doing, the drives need to apply a not inconsiderable driving power as well as a correspondingly high torque in order to make possible the intended deformation of the workpiece. In so doing, the drive device also needs generally to be movable in order to make possible the feed motion along the workpiece axis. The resulting high-performance drives represent a considerable cost factor in respect of the whole device or method.

BRIEF SUMMARY OF THE INVENTION

The object of the present invention is therefore to demonstrate a device and a method for flow-forming workpieces which have lower investment costs than those of the prior art.

The object is achieved by a device and a method with the features of the independent claims. The features of the dependent claims relate to advantageous embodiments.

According to the invention, the device has a drive for driving an outer forming tool. The outer forming tool which is preferably designed as a forming roller, can thus displace the workpiece in rotation about the workpiece axis as per the method according to the invention. The conventional rotary drive which acts directly on the workpiece of a conventional device of the type being discussed can be relieved or replaced by a forming tool driven in this way. In so doing, it has surprisingly been shown that when the workpiece rotation is driven according to the invention over the outer forming tool, a significantly lower driving power is required to achieve the same forming effect than in devices in which the workpiece rotation is driven according to the described prior art. A possible explanation for the significantly lower required driving power is that when the workpiece rotation is driven according to the invention, overall lower friction losses occur over the outer forming tools. Correspondingly, it is also sufficient to adjust the speed or the rotation speed of the outer forming tools such that the circumferential speed of the outer forming tools is only slightly greater in the contact region with the workpiece than the circumferential speed on the surface of the workpiece.

In so doing, it is possible that, in addition to the driven outer forming tool, further outer forming tools act in the same plane on the outer contour of the workpiece, perpendicular to the workpiece axis. In so doing, the further outer forming tools can likewise be driven, but also non-driven, conventional outer forming tools. The outer forming tools are arranged preferably uniformly over the circumference of the workpiece, such that the forces acting on the workpiece in radial direction which are applied by the individual outer forming tools are preferably mutually canceled out. In this way, the workpiece can be supported on the inner forming tool without this needing to absorb forces acting in a radial direction.

Likewise, advantageously it is conceivable to arrange a plurality of outer forming tools along the workpiece axis. With such a configuration, a plurality of forming steps as per the method according to the invention can be carried out on the same workpiece in a single pass of a device according to the invention. This is advantageous in particular if high degrees of forming are intended to be achieved. Because the outer and/or inner workpiece diameter is changed with every forming step, particularly advantageously the drive parameters, in particular the circumferential speed of the respective outer forming tool, can be adapted to the conditions of the respective forming zone. In this way, the slippage losses and friction losses which result in the individual forming units arranged one behind the other along the workpiece axis are minimized in a targeted manner if the forming units are passed through simultaneously by the same workpiece.

A further advantageous development which involves a more efficient use of the available drive capacity, consists of the device according to the invention having a second outer forming tool which is driven preferably by a common drive with the first forming tool. As a result of this, structural modifications of the device according to the invention are made possible, the aim of which is to provide the ability for a plurality of driven forming tools to call on the driving power provided by the drive.

This advantageously makes possible alternating operation when producing workpieces in different workpiece receiving devices of a device according to the invention. In so doing, a workpiece receiving device is composed preferably of a workpiece magazine and a workpiece buttress, between which the workpiece is tensioned axially along the workpiece axis. If in this case a plurality, preferably two, such workpiece receiving devices are assigned to a common drive unit, then it is possible that the forming of a workpiece takes place in a workpiece receiving unit, while another workpiece receiving unit is stocked with a workpiece to be formed or a formed workpiece is removed from this workpiece receiving unit. In this way, down times, which inevitably occur when batch-feeding a workpiece receiving device for the drive assigned to this workpiece receiving device, can be used to form a workpiece in another workpiece receiving device. The ultimate result of this is a device which makes possible double or multiple production capacity, and in so doing requires just one drive device for the outer forming tool or the outer forming tools.

BRIEF DESCRIPTION OF THE DRAWINGS

The invention is described schematically below in more detail with the help of FIGS. 1 to 9.

DETAILED DESCRIPTION OF PREFERRED EMBODIMENTS

Figure 1:
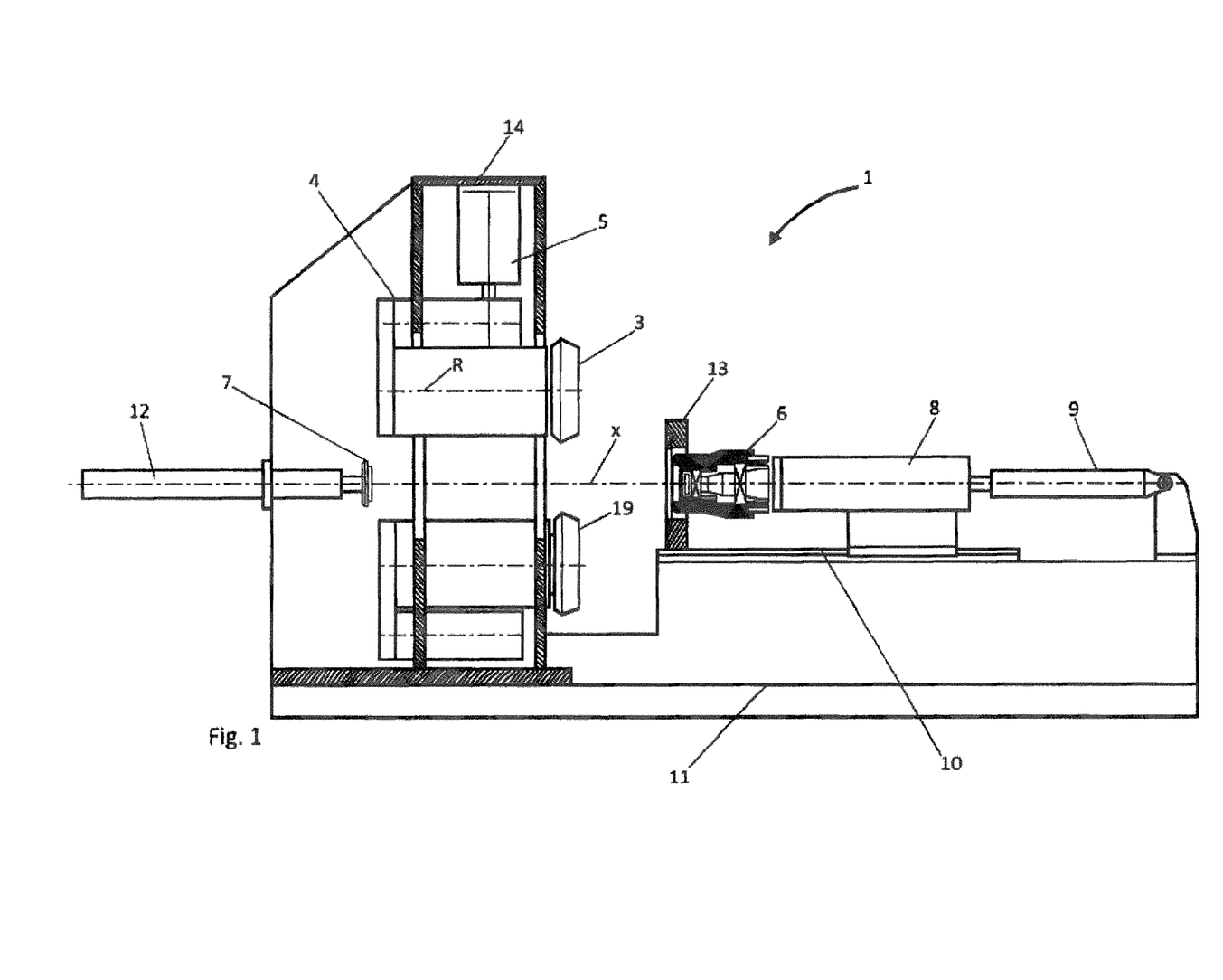
FIG. 1 shows a schematic representation of an exemplary device according to the invention.

The exemplary device 1 according to the invention represented in FIG. 1 has an outer forming tool 3 acting on an outer contour of a workpiece 2. The outer forming tool 3 is designed as a forming roller in the shown example. The exemplary device 1 has a drive 4 for driving the outer forming tool 3. A feed mechanism 5 which can, for example, be designed in particular as a hydraulic cylinder makes possible the feeding of the outer forming tool 3 in a radial direction. The feeding in a radial direction serves in particular to predetermine the outer diameter of the workpiece 2 produced in the forming zone.

In the case of the device shown in FIG. 1, the inner forming tool 6 is designed as a mandrel. In this exemplary embodiment the inner forming tool 6 designed as a mandrel also assumes the function of the workpiece magazine and forms an exemplary workpiece receiving device together with the workpiece buttress 7. The inner forming tool 6 is received on a receiver 8 for the inner forming tool. In so doing, the inner forming tool 6 is housed, preferably rotatably, relative to the receiver 8 in order that the inner forming tool 6 can follow the movements of the flowing material and/or of the rotating workpiece in circumferential direction. The receiver 8, and thus the inner forming tool 6, are displaceably housed preferably along the workpiece axis X. For this, preferably a linear guide 10 is provided which connects the receiver 8 to the machine frame 11. A feed device 9, which for example can be formed as a feed cylinder, advantageously carries out the feed movement in the shown example. In so doing, the feed device 9 preferably acts with a counterpressure device 12, which serves to exert a counterforce along the workpiece axis X on the workpiece via the workpiece buttress 7, such that an axial tensioning of the workpiece results between the workpiece buttress 7 and the inner forming tool 6 acting as workpiece magazine.

The inner forming tool 6 advantageously has, in the shown example, a profiled surface. During forming, the plasticized material flows into the profile of the surface of the inner forming tool. In this way, profiles can be produced on the inner contour of the formed workpiece. In order to be able to remove the workpiece 2 from the inner forming tool 6 after forming, the exemplary device 1 according to the invention advantageously has a workpiece removal device 13 for removing the workpiece 2 from the inner forming tool 6. The workpiece removal device 13 can—as shown in the example—be designed as a stripping device. In the shown example this functions such that the workpiece removal device is moved along the workpiece axis X relative to the inner forming tool 6, such that a workpiece 6 received on the inner forming tool 6 is detected by the workpiece removal device 13 and stripped from the inner forming tool 6.

As an alternative to the shown example it is possible to equip a device 1 according to the invention with an inner forming tool 6 as is known for example from EP 2343138. Such an inner forming tool 6 is characterized in that the position of the forming zone on the inner forming tool and thus the resulting inner workpiece diameter can be predetermined by the relative position of the inner forming tool 6 and outer forming tool 3 along the workpiece axis X. In order for this to be possible, the workpiece 2 must be displaceable along the workpiece axis X, i.e. In this case, the inner forming tool 6 will not generally also be able to assume the function of the workpiece magazine.

In so doing, it is fundamentally possible, with each of the embodiments described in conjunction with the present invention, depending on the type of component to be produced, to provide an inner forming tool 6, as represented in FIG. 1, or an inner forming tool 6, designed in a different way, in particular an inner forming tool 6 within the meaning of EP 2343138. The type of the inner forming tool 6 represented with the respective embodiment is merely an example. Accordingly, the embodiment represented in FIG. 2 is equipped, by way of example, with two inner forming tools 6.1 and 6.2 which correspond to the inner forming tool represented in FIG. 1.

Figure 3:
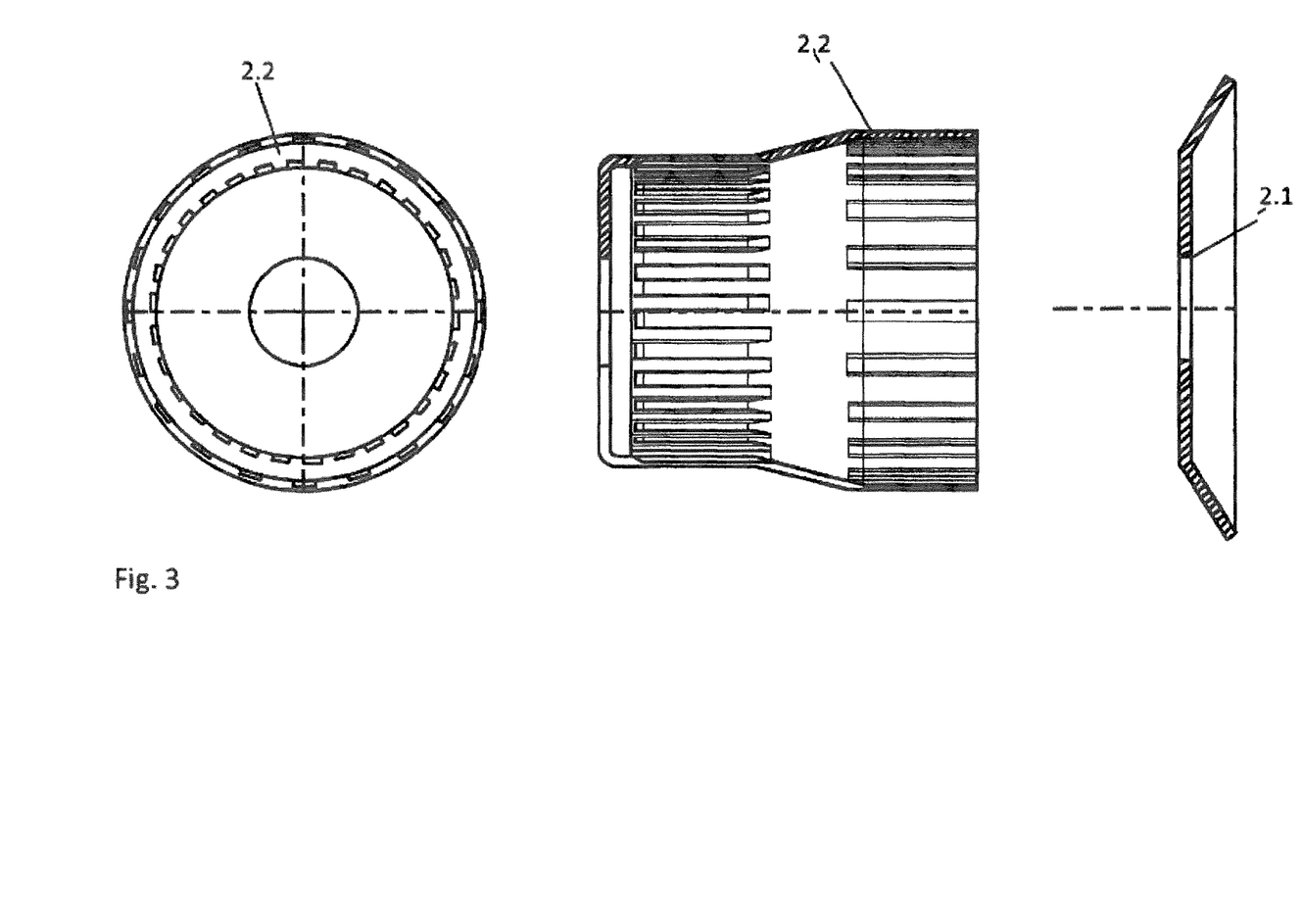
FIG. 3 shows an exemplary workpiece in the form of a coupling housing before and after forming.

In FIG. 3, a workpiece 2.1 is represented by way of example before forming and a workpiece 2.2 after forming. The view along the axis and the sectional representation of the formed workpiece 2.2 illustrate that it is possible to produce workpieces 2.2 with profiled inner contours, in particular if the inner forming tool 6.1 or 6.2 has a corresponding profile of its outer contour.

Figure 2:
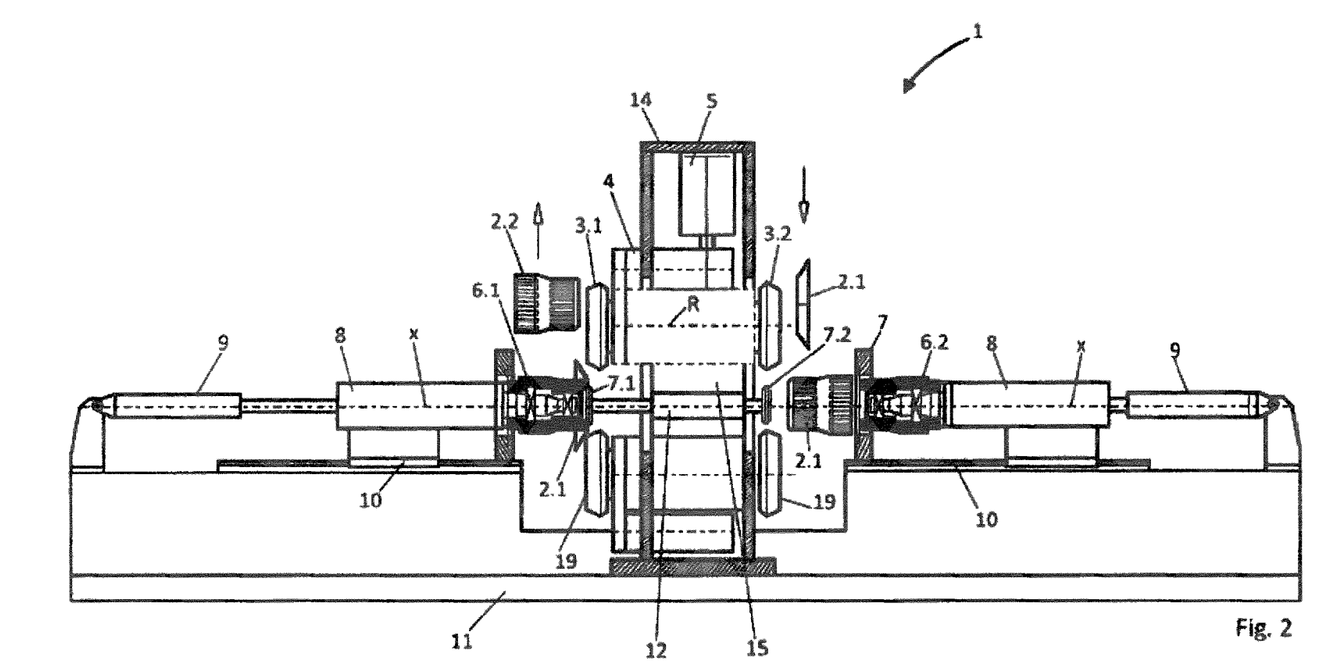
FIG. 2 shows a schematic representation of a further exemplary device according to the invention with two workpiece receiving devices which are arranged along a common workpiece axis.

The exemplary device 1 according to the invention represented in FIG. 2 differs from the exemplary device 1 according to the invention represented in FIG. 1, in particular in that the device 1 has a first workpiece receiving device and a second workpiece receiving device. In so doing, both workpiece receiving devices are arranged preferably on the same common workpiece axis X. The first workpiece receiving device is formed in the shown example preferably by a first inner forming tool 6.1 acting as first workpiece magazine, which workpiece preferably interacts with a first workpiece buttress 7.1 to axially tension a workpiece 2. Accordingly, in its function as second workpiece magazine a second inner forming tool 6.2 preferably forms a second workpiece receiving device which also preferably interacts with the second workpiece buttress 7.2.

Because of the two workpiece receiving devices it is advantageously possible to produce workpieces in alternating operation between the individual workpiece receiving devices. In so doing, each workpiece receiving device is stocked with a new workpiece 2.1 or a finished formed workpiece 2.2 is removed while a workpiece 2 is formed in the other workpiece receiving device.

Accordingly, the exemplary device 1 represented has a first outer forming tool 3.1 and a second outer forming tool 3.2 which are driven by a common drive 4. Preferably, in so doing, the first outer forming tool 3.1 and the second outer forming tool 3.2 are arranged on a common shaft.

In each case, one of the outer forming tools 3.1 and 3.2 is arranged on a side of the forming unit 14 facing one of the two workpiece receiving devices. In the center of the forming unit 14, a spatial region is thus formed in which the first buttress 7.1 or the second buttress 7.2 can be forced backwards by the feed motion of a workpiece 2. The spatial region 15 is thus used jointly by both workpiece buttresses 7.1 and 7.2, preferably at least by both workpiece receiving devices, such that a counterpressure device 12 which acts on both workpiece buttresses 7.1 and 7.2 is arranged in the spatial region 15.

Figure 4:
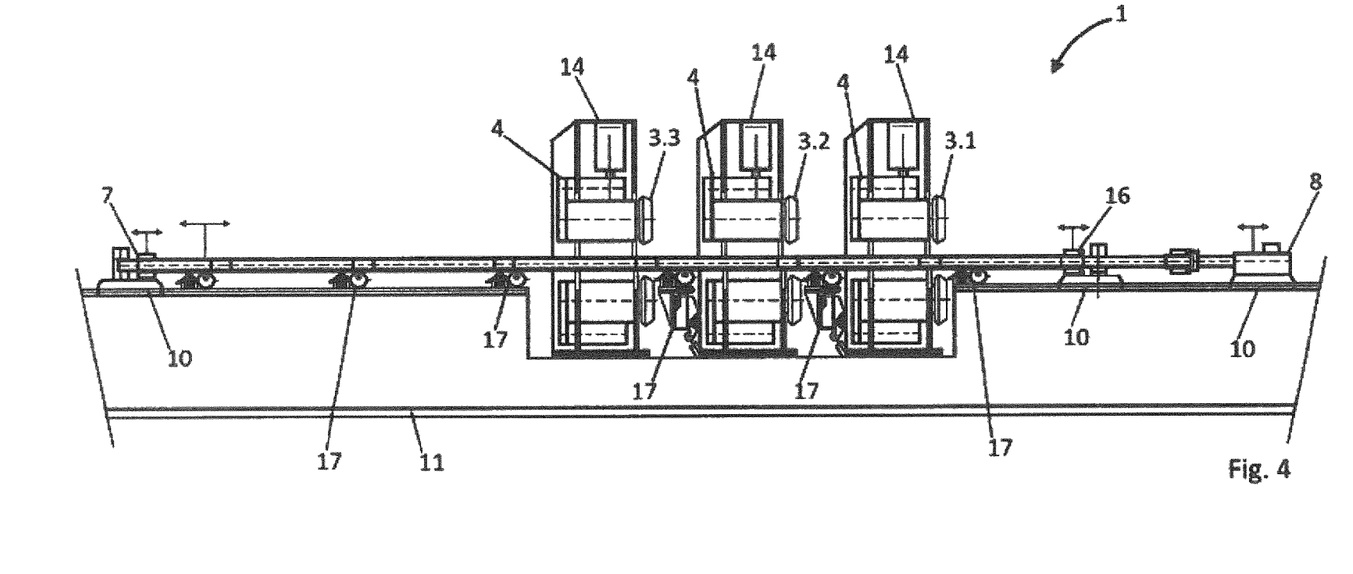
FIG. 4 shows a further exemplary device according to the invention, which is designed for producing long workpieces.
Figure 5:
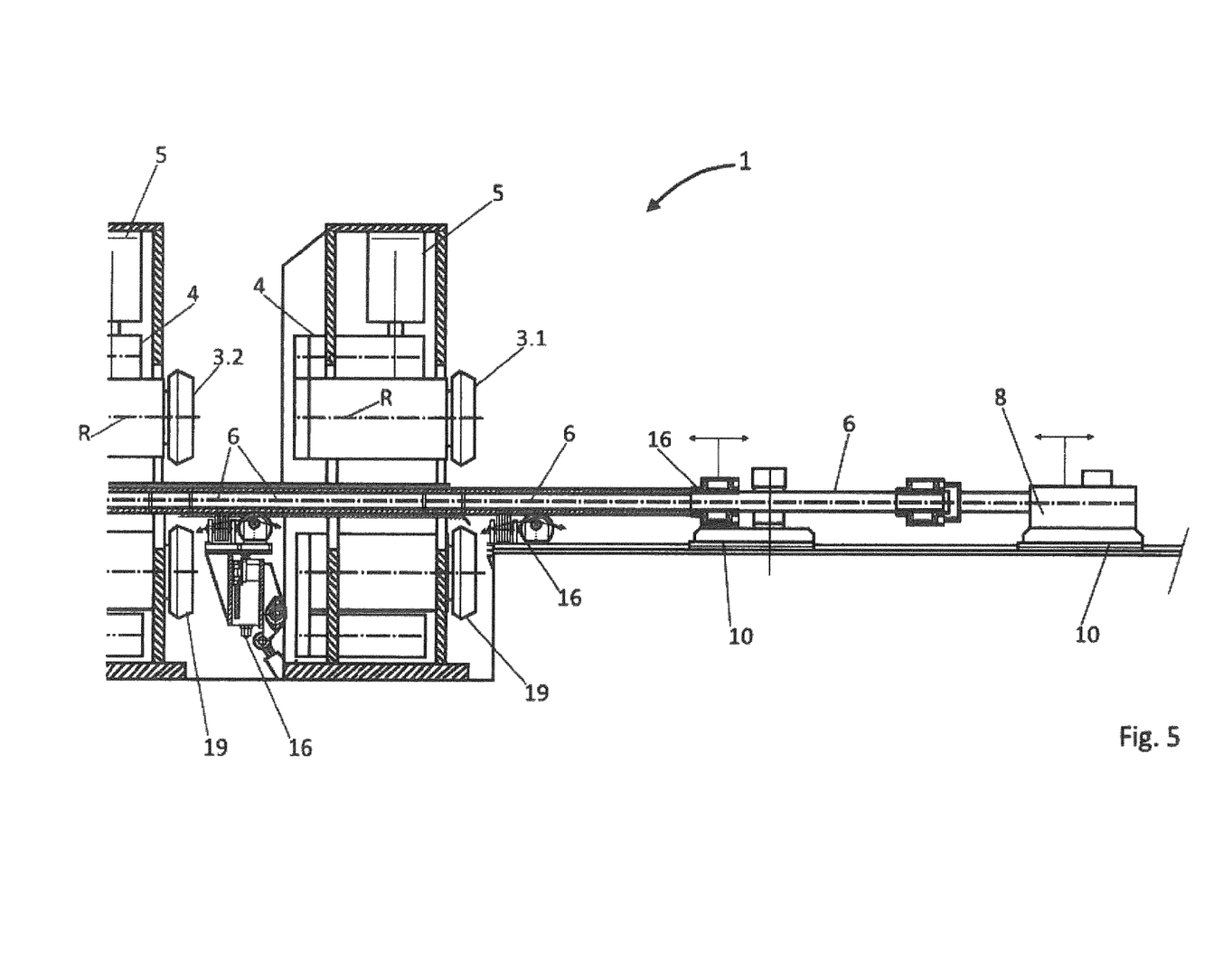
FIGS. 5 and 6 show enlarged representations of the exemplary device according to the invention represented in FIG. 4.
Figure 6:
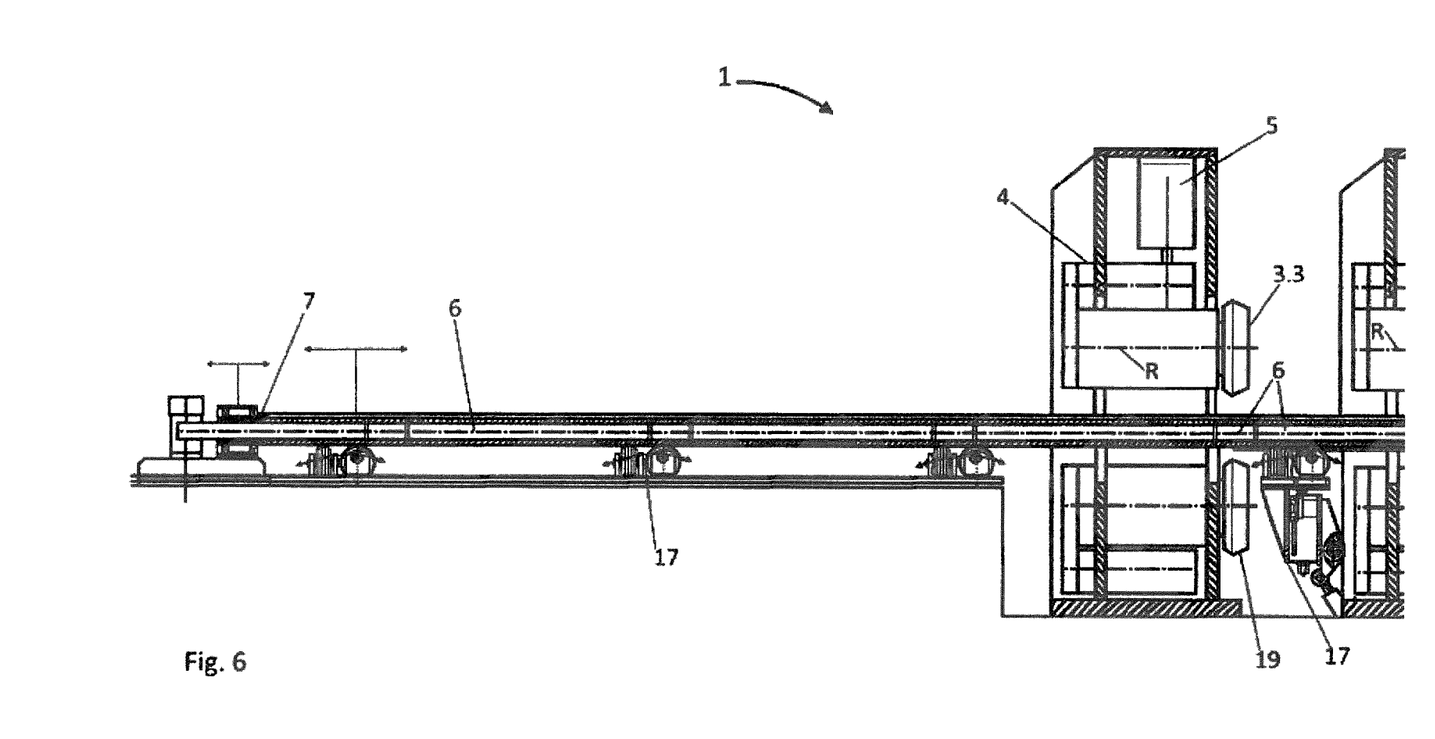

In FIGS. 4, 5 and 6, an exemplary device according to the invention is represented which is suitable in particular for producing long workpieces, such as for example masts for illumination devices or the like. This advantageous embodiment is characterized in particular in that a plurality of forming units 14—in the represented example, three—is arranged one behind the other along the workpiece axis X. In the shown example, the structure of the individual forming units 14 corresponds preferably to the respective exemplary forming unit 14 represented in FIG. 1. The essential difference between the device represented in FIG. 4 and the device 1 represented in FIG. 1 is the design of the housing of the workpiece 2 and the inner forming tool 6. The workpiece 2 is axially tensioned between a workpiece magazine 16 and a workpiece buttress 7 along the workpiece axis X. In the shown example, the inner forming tool 6 is rotatably housed preferably about the workpiece axis X on a receiver 8 for the inner forming tool. The receiver 8, the workpiece magazine 16 and/or the workpiece buttress 7 are received, developed displaceable along the workpiece axis X, in particular by a linear guide 10 on the machine frame 11.

During forming with the device 1 represented in FIG. 4, a first outer forming tool 3.1 acts firstly on the outer contour of the workpiece 2. As the feed motion continues, the region of the workpiece 2 already formed by the first outer forming tool 3.1 arrives in the operating area of the second outer forming tool 3.2 which carries out a further forming step on the workpiece 2. In the shown example, the workpiece passes through a further, third outer forming tool 3.3. It is, however, in principle possible to set any number of outer forming tools one after the other in the described manner to act on the workpiece 2.

In order to improve the housing of such long workpieces, support devices 17 can be provided. These can for example be support rollers. The support devices 17 are preferably designed such that they make possible a support of the weight of the workpiece 2, in so doing simultaneously, however, permitting a movement of the workpiece 2. Thus they can be support rollers which are oriented such that they make possible an axial displacement and/or a rotation about the workpiece axis X. Particularly preferably, the support rollers are pivotable, such that they make possible alternatively axial displacement and rotation of the workpiece 2 or can permit superpositions of axial feed and rotation by setting the angle accordingly.

Figure 7:
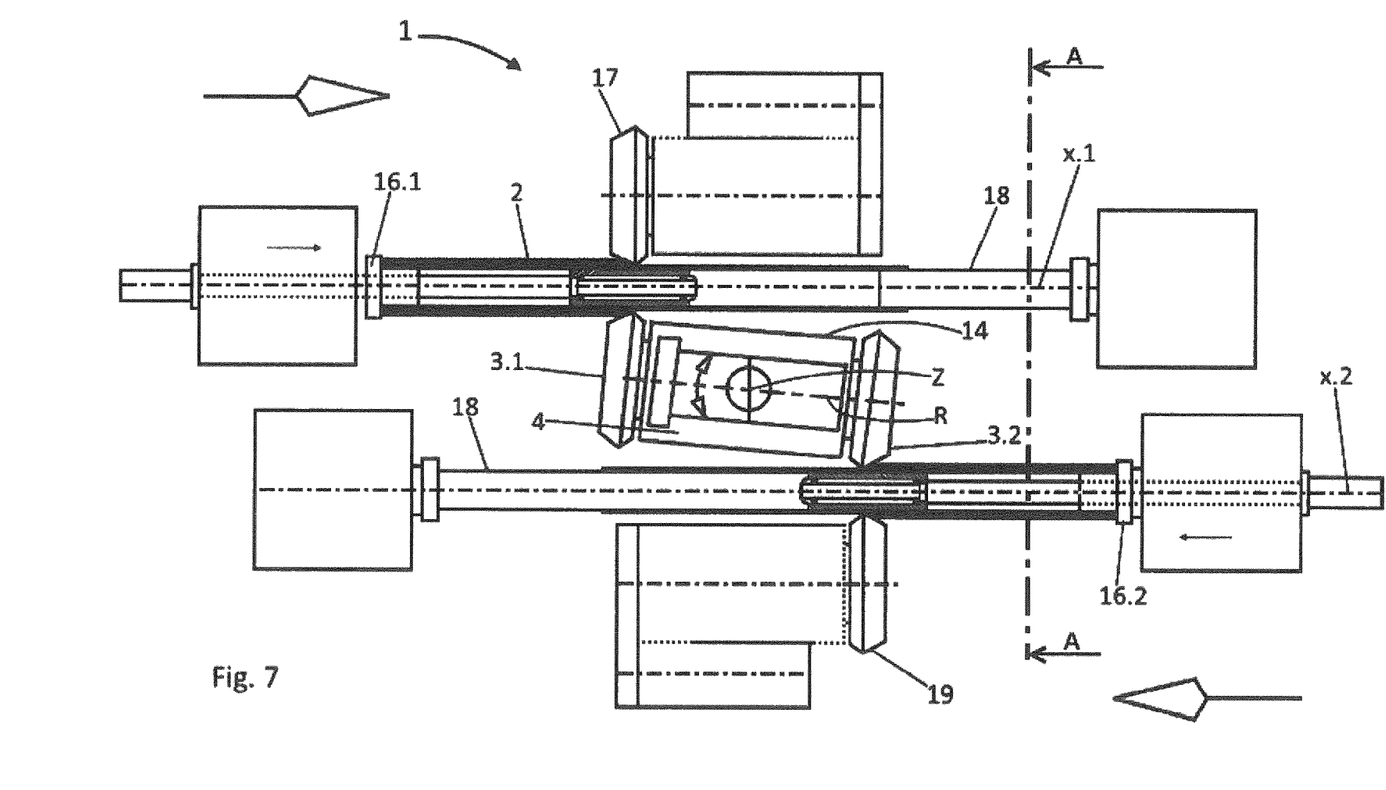
FIG. 7 shows an exemplary device according to the invention which makes possible the simultaneous production of long workpieces in two workpiece receiving devices when using a common drive.
Figure 8:
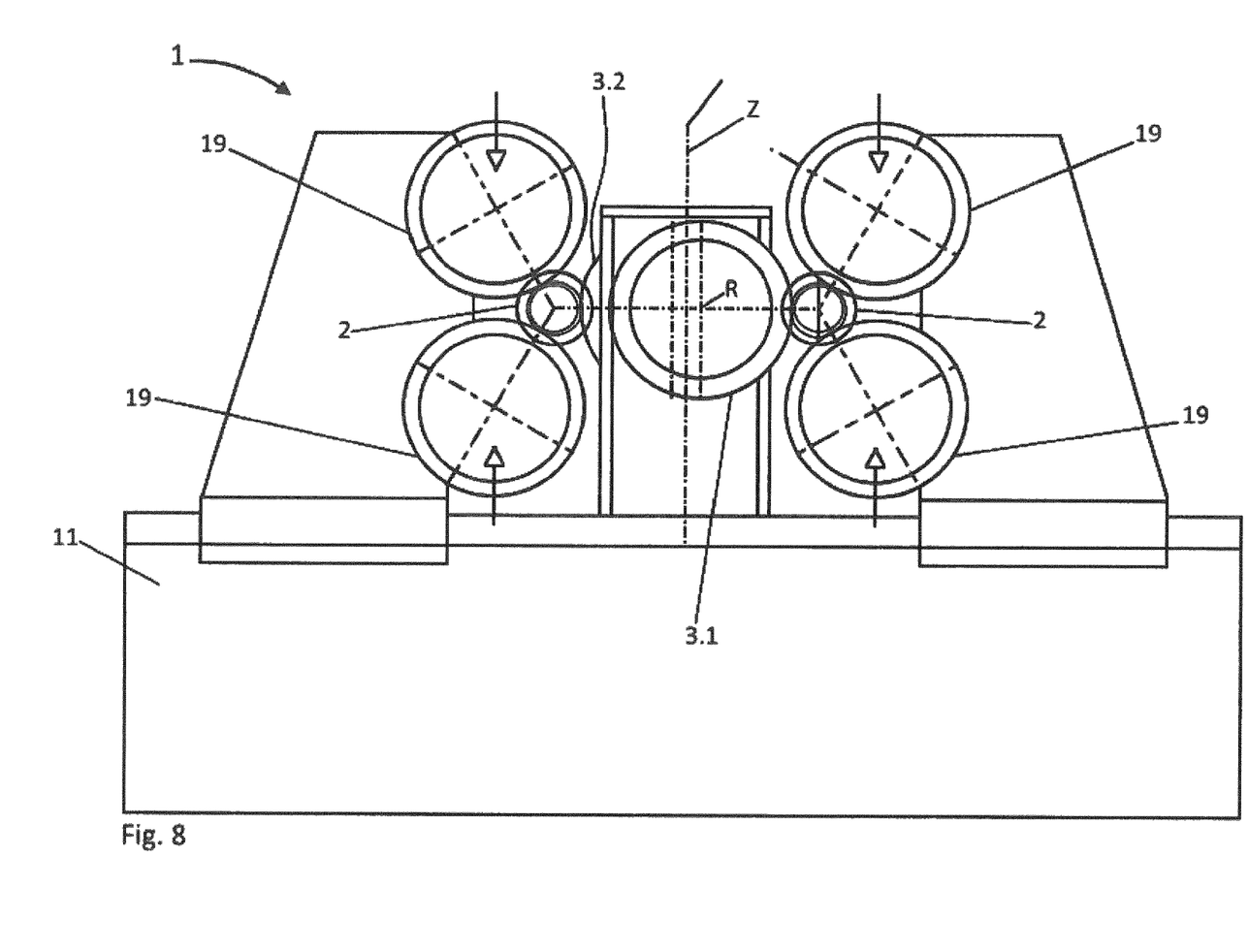
FIG. 8 shows the device represented in FIG. 7 from a different perspective.

A further advantageous embodiment of the present invention is represented in FIGS. 7 and 8. This device 1 likewise has a first outer forming tool 3.1 and a second outer forming tool 3.2 which are driven by a common drive 4. The workpiece receiving devices are arranged on the sides of the common drive 4 of the outer forming tools 3.1 and 3.2 facing away from one another. The outer forming tools 3.1 and 3.2 are likewise arranged preferably on a common shaft.

The represented exemplary workpiece receiving devices preferably each have a workpiece magazine 16.1 or 16.2. On the side facing away from the workpiece magazine 16.1 or 16.2, the workpieces 2 are centered in the shown example merely by a centering mandrel 18, but can slide on same in axial direction. This type of workpiece housing can be produced self-evidently also in conjunction with the above-described other embodiments. Likewise, it is possible to equip the device shown in FIGS. 7 and 8 with a workpiece buttress within the meaning of the aforementioned embodiments.

The device 1 according to the invention has the advantage that workpieces can be machined in both workpiece receiving devices with a drive unit 4.

In so doing, a feed of the outer forming tools 3.1 and 3.2 is advantageously possible because the common axis of the outer forming tools 3.1 and 3.2 is pivoted about a feed axis Z. Preferably, in so doing, the whole forming unit 14 is pivotably housed with the drive and the forming tools 3.1 and 3.2 connected via a preferably common shaft. The feed axis Z travels preferably perpendicular to the plane defined by the workpiece axes X.1 and X.2. The common axis of rotation R of the forming tools 3.1 and 3.2 thus travels during the forming at an acute angle to the first workpiece axis X.1 and/or to the second workpiece axis X.2.

Figure 9:
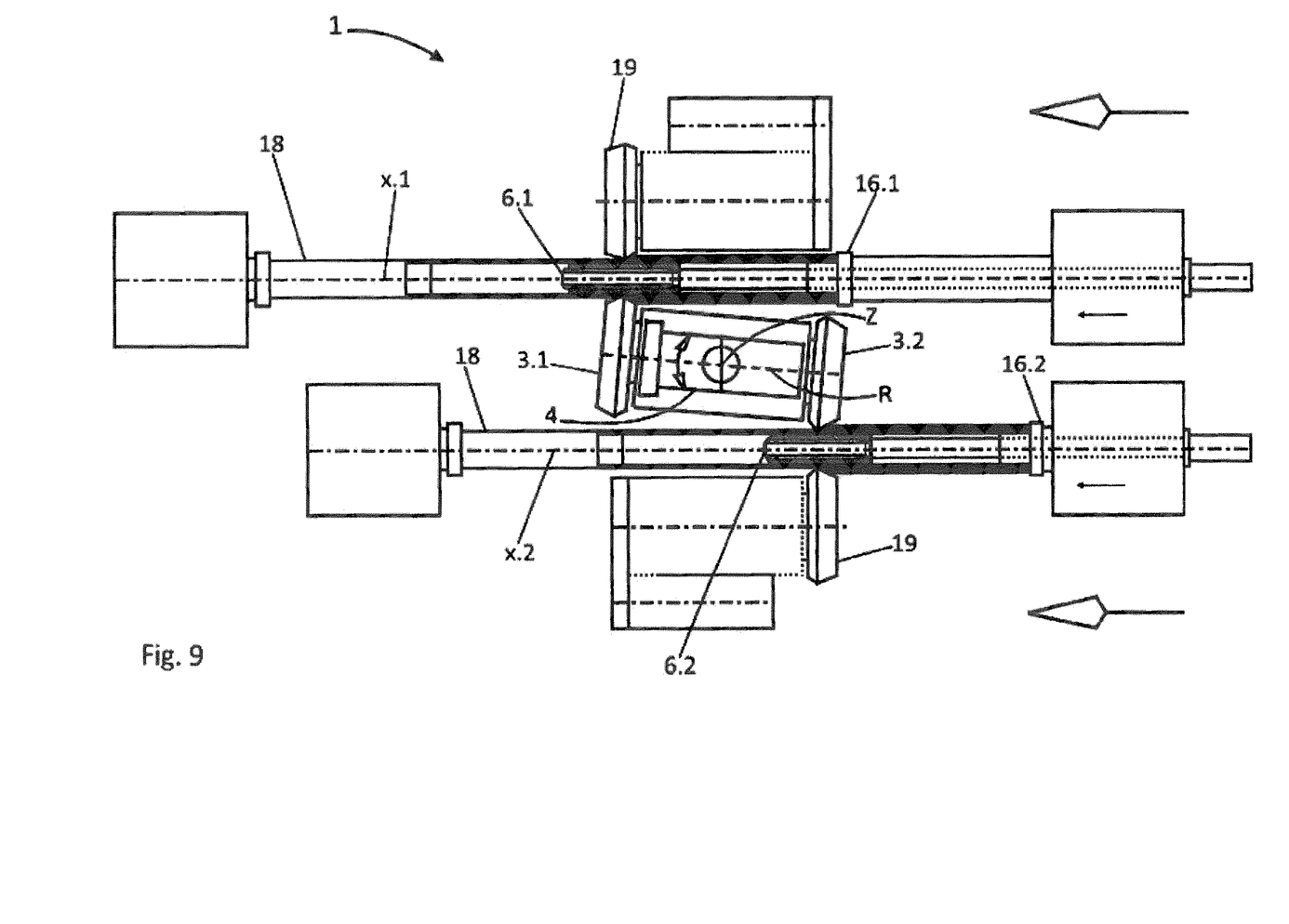
FIG. 9 shows a modified form of the device shown in FIGS. 7 and 8, in which the workpiece receiving devices are arranged such that a machining with the same feed direction can take place in both workpiece receiving devices.

A modification of the device 1 represented in FIGS. 7 and 8 is shown in FIG. 9 which differs merely in that the feed direction of the workpieces 2 is the same direction along the first and second workpiece axis X.1 and X.2. In the embodiment represented in FIGS. 7 and 8, the feed directions are opposite.

With all the embodiments represented, it is possible for further forming tools 19 to be present which act in the same plane perpendicular to the workpiece axis X on the workpiece 2 as a forming tool 3 driven according to the invention. The further forming tools 19 can, in so doing, likewise be driven. They can also be driveless forming tools 19. These are preferably arranged over the circumference such that the radially exerted forces of the individual forming tools are canceled out. In this way, the inner contour of the workpiece 2 can be supported on the inner forming tool 6 during forming, without this being burdened with bending moments.

What is claimed is:

1. A device (1) for flow-forming workpieces (2, 2.1, 2.2), comprising:
    a rotatable first outer forming tool (3, 3.1) for acting on an outer contour of a first of the workpieces (2, 2.1) and a rotatable second outer forming tool (3, 3.2) for acting on an outer contour of a second of the workpieces (2, 2.2);
    a first inner forming tool (6, 6.1) for acting on an inner contour of the first of the workpieces (2, 2.1) and a second inner forming tool (6, 6.2) for acting on an inner contour of the second of the workpieces (2, 2.2);
    a forming zone between the first forming tools (3, 3.1, 6, 6.1);
    at least one drive (4) for driving each of the outer forming tools (3, 3.1, 3.2);
    a first workpiece magazine (16, 16.1) and a second workpiece magazine (16, 16.2);
    a first workpiece buttress (7, 7.1) and a second workpiece buttress (7, 7.2);
    a first workpiece receiving device which is designed such that the first of the workpieces (2, 2.1) is axially tensioned between the first workpiece magazine (16, 16.1) and the first workpiece buttress (7, 7.1) in the direction of a first workpiece axis (X, X.1), wherein the first workpiece magazine (16, 16.1) and the first workpiece buttress (7, 7.1) are displaced axially along the first workpiece axis (X, X.1) relative to the first outer forming tool (3, 3.1); and
    a second workpiece receiving device which is designed such that the second of the workpieces (2, 2.2) is axially tensioned between the second workpiece magazine (16, 16.2) and the second workpiece buttress (7, 7.2) in the direction of a second workpiece axis (X, X.2), wherein the second workpiece magazine (16, 16.2) and the second workpiece buttress (7, 7.2) are displaced axially along the second workpiece axis (X, X.2) relative to the second outer forming tool (3, 3.2),
    wherein the first of the workpieces (2, 2.1) is displaced in rotation about the first workpiece axis (X, X.1) and is plastically deformed by a pressure applied by the first inner forming tool (6, 6.1) and the first outer forming tool (3, 3.1) in the forming zone between the first forming tools (3, 3.1, 6, 6.1) as material making up the first of the workpieces (2, 2.1) flows in the forming zone between the first forming tools (3, 3.1, 6, 6.1).

2. The device (1) according to claim 1,
    wherein the second outer forming tool (3, 3.2) is arranged with the first outer forming tool (3, 3.1) on a common axis of rotation (R), wherein the at least one drive (4) is a common drive (4) for driving the first outer forming tool (3, 3.1) and the second outer forming tool (3, 3.2).

3. The device (1) according to claim 2,
    wherein the first workpiece receiving device and the second workpiece receiving device are arranged on sides of the drive (4) facing away from one another.

4. The device (1) according to claim 2,
    wherein the common axis of rotation (R) travels at an acute angle to at least one of the first workpiece axis (X, X.1) and the second workpiece axis (X, X.2).

5. The device (1) according to claim 2,
    wherein the first workpiece receiving device and the second workpiece receiving device are designed and arranged such that both workpiece receiving devices use a common spatial area (15) for receiving at least one partial region of a respective one of the formed workpieces (2, 2.1, 2.2) and/or a respective one of the workpiece receiving devices,
    wherein the workpiece buttress (7, 7.1, 7.2) of both of the workpiece receiving devices is displaced in the common spatial area (15), and
    wherein the first workpiece receiving device and the second workpiece receiving device have a common workpiece axis (X).

6. The device (1) according to claim 2,
    wherein the device (1) further comprises further outer forming tools (19) which act on the outer contour of a respective one of the workpieces (2, 2.1, 2.2) in a plane that is the same plane as at least one of the first outer forming tool (3, 3.1) and the second outer forming tool (3, 3.2), the plane being perpendicular to the workpiece axis (X, X.1, X.2).

7. The device (1) according to claim 1,
    wherein the device (1) has a plurality of the outer forming tools (3, 3.1, 3.2, 3.3) arranged one behind the other along the first workpiece axis (X, X.1).

8. The device (1) according to claim 2,
    wherein at least one of the first outer forming tool (3, 3.1) and the second outer forming tool (3, 3.2) is pivotable to feed on a feed axis (Z).

9. A method for flow-forming workpieces (2), comprising:
a) supplying a device (1) for flow-forming workpieces (2, 2.1, 2.2), comprising:
    a rotatable first outer forming tool (3, 3.1) for acting on an outer contour of a first of the workpieces (2, 2.1) and a rotatable second outer forming tool (3, 3.2) for acting on an outer contour of a second of the workpieces (2, 2.2);

a first inner forming tool (6, 6.1) for acting on an inner contour of the first of the workpieces (2, 2.1) and a second inner forming tool (6, 6.2) for acting on an inner contour of the second of the workpieces (2, 2.2);

a drive (4) for driving the outer forming tools (3, 3.1, 3.2);

a first workpiece magazine (16, 16.1) and a second workpiece magazine (16, 16.2);

a first workpiece buttress (7, 7.1) and a second workpiece buttress (7, 7.2);

a first workpiece receiving device; and a second workpiece receiving device;

b) axially tensioning the first of the workpieces (2, 2.1) between the first workpiece magazine (16, 16.1) and the first workpiece buttress (7, 7.1) in the direction of a first workpiece axis (X, X.1), wherein the first workpiece magazine (16, 16.1) and the first workpiece buttress (7, 7.1) are displaced axially along the first workpiece axis (X, X.1) relative to the first outer forming tool (3, 3.1);

c) axially tensioning the second of the workpieces (2, 2.2) between the second workpiece magazine (16, 16.2) and the second workpiece buttress (7, 7.2) in the direction of a second workpiece axis (X, X.2), wherein the second workpiece magazine (16, 16.2) and the second workpiece buttress (7, 7.2) are displaced axially along the second workpiece axis (X, X.2) relative to the second outer forming tool (3, 3.2);

d) rotating the first outer forming tool (3, 3.1) as a forming roller, whereby the rotating first outer forming tool (3, 3.1) acts on the outer contour of the first of the workpieces (2, 2.1), wherein the rotating first outer forming tool (3, 3.1) interacts with the first inner forming tool (6, 6.1), which is arranged inside the first of the workpieces (2, 2.1) such that a first forming zone forms between the first inner forming tool (6, 6.1) and the first outer forming tool (3, 3.1), in which first forming zone the material of the first of the workpieces (2, 2.1) is caused to flow by a pressure exerted by the first forming tools (3, 3, 1, 6, 6.1);

e) displacing the first of the workpieces (2, 2.1) in rotation about the first workpiece axis (X, X.1) by the first outer forming tool (3, 3.1);

f) wherein a rotating the second outer forming tool (3, 3.2) as a forming roller, driven together with the first outer forming tool (3, 3.1) by the drive (4), whereby the rotating second outer forming tool (3, 3.2) acts on the outer contour of the second of the workpieces (2, 2.2), wherein the rotating second outer forming tool (3, 3.2) interacts with the second inner forming tool (6.2), which is arranged inside the second of the workpieces (2, 2.2) such that a second forming zone forms between the second inner forming tool (6, 6.2) and the second outer forming tool (3, 3.2), in which second forming zone the material of the second of the workpieces (2, 2.2) is caused to flow by a pressure exerted by the second forming tools (3, 3.2, 6, 6.2), and g) displacing the second of the workpieces (2, 2.2) in rotation about the second workpiece axis (X, X.2) by the second outer forming tool (3, 3.2).

10. The method according to claim 9, wherein during forming, the first of the workpieces (2, 2.1) and the second of the workpieces (2, 2.2) are moved in opposite directions along at least one of the first workpiece axis (X, X.1) and the second workpiece axis (X, X.2).

11. The method according to claim 9, wherein the first and the second workpieces (2, 2.1, 2.2) are received during forming respectively in one of the first and second receiving devices, which are assigned to the first and the second outer forming tools (3, 3.1, 3.2) respectively, and the workpieces (2, 2.1, 2.2) are moved into the other of the workpiece receiving devices when the respective one of the workpieces (2, 2.1, 2.2) is being formed in the one of the workpiece receiving devices.

12. The method according to claim 9, wherein, due to the relative position of the inner forming tools (6, 6.1, 6.2) to the outer forming tools (3, 3.1, 3.2) interacting with the respective one of the inner forming tools along the workpiece axis (X, X.1, X.2) assigned to the respective one of the inner forming tools (6, 6.1, 6.2), the inner diameter of the respective one of the workpieces (2, 2.1, 2.2) to be produced is predetermined at the respective position along the respective workpiece axis (X, X.1, X.2) of the respective one of the forming zones.

* * * * *